US008473912B2

(12) United States Patent
O'Farrell et al.

(10) Patent No.: US 8,473,912 B2
(45) Date of Patent: Jun. 25, 2013

(54) COMPUTER READABLE MEDIUM, SYSTEM AND METHOD OF DEBUGGING SOFTWARE APPLICATIONS MODELLED USING FLOW PARADIGMS

(75) Inventors: William G. O'Farrell, Markham (CA); Evangelos Mamas, Toronto (CA); Shu Xia Tan, Toronto (CA); Simon D. Moser, Abstatt (DE)

(73) Assignee: International Business Machines Corporation, Armonk, NY (US)

( * ) Notice: Subject to any disclaimer, the term of this patent is extended or adjusted under 35 U.S.C. 154(b) by 3081 days.

(21) Appl. No.: 10/650,906

(22) Filed: Aug. 28, 2003

(65) Prior Publication Data
US 2004/0168155 A1 Aug. 26, 2004

(30) Foreign Application Priority Data
Feb. 13, 2003 (CA) .................................. 2420479

(51) Int. Cl.
*G06F 9/44* (2006.01)
(52) U.S. Cl.
USPC ......................................... 717/124; 717/129
(58) Field of Classification Search
USPC ................................ 717/124–132
See application file for complete search history.

(56) References Cited

U.S. PATENT DOCUMENTS

| | | | | |
|---|---|---|---|---|
| 5,652,909 A * | 7/1997 | Kodosky | ....................... | 717/125 |
| 5,740,440 A * | 4/1998 | West | ............................. | 717/125 |
| 6,126,328 A * | 10/2000 | Mallory et al. | ................ | 717/114 |
| 6,151,701 A | 11/2000 | Humphreys et al. | | |
| 6,189,142 B1 | 2/2001 | Johnston et al. | | |
| 6,233,728 B1 | 5/2001 | Carter et al. | | |
| 6,253,368 B1 * | 6/2001 | Nelin et al. | .................... | 717/124 |
| 6,516,408 B1 * | 2/2003 | Abiko et al. | .................. | 712/227 |
| 6,519,766 B1 * | 2/2003 | Barritz et al. | ................. | 717/130 |
| 6,658,649 B1 * | 12/2003 | Bates et al. | ................... | 717/124 |
| 6,701,514 B1 * | 3/2004 | Haswell et al. | ............... | 717/115 |
| 6,715,139 B1 * | 3/2004 | Kodosky et al. | .............. | 717/125 |
| 6,721,941 B1 * | 4/2004 | Morshed et al. | .............. | 717/127 |
| 6,795,962 B1 * | 9/2004 | Hanson | ......................... | 717/129 |
| 6,907,546 B1 * | 6/2005 | Haswell et al. | ................. | 714/38 |
| 6,957,422 B2 * | 10/2005 | Hunt | .............................. | 717/130 |
| 6,964,036 B2 * | 11/2005 | Bates et al. | ................... | 717/125 |
| 6,978,399 B2 * | 12/2005 | Bates et al. | ...................... | 714/34 |
| 7,096,458 B2 * | 8/2006 | Bates et al. | ................... | 717/124 |

OTHER PUBLICATIONS

C.E. McDowell, et al, "Debugging Concurrent Programs". Board of Studies in Computer and Information Sciences, University of California at Santa Cruz, California 95064; ACM Computing Surveys, vol. 21, No. 4, Dec. 1989.
R.H.B. Netzer, et al., "Optimal Tracing and Incremental Reexecution for Debugging Long-Running Programs", Department of Computer Science Brown University, Providence. Rhode Island 02912. CS-94-11, Mar. 1994.
D. Neri, et al, "Debugging Distributed Applications with Replay Capabilities", Proceedings of the conference on TRI-Ada '97, pp. 189-195 Published by ACM 1997 Article.

* cited by examiner

*Primary Examiner* — Anna Deng
(74) *Attorney, Agent, or Firm* — David A. Mims, Jr.

(57) ABSTRACT

A debugger allows debugging of applications using a flow paradigm. Breakpoints may be set based on the flow model. Similarly, variables used by the flow model may be queried. Debugging information may be presented in a graphical user interface, in conjunction with a depiction of the application using a flow diagram.

15 Claims, 17 Drawing Sheets

FIG. 9

COMPUTER READABLE MEDIUM, SYSTEM AND METHOD OF DEBUGGING SOFTWARE APPLICATIONS MODELLED USING FLOW PARADIGMS

FIELD OF THE INVENTION

The present invention relates to software debuggers, and more particularly to debuggers and methods suitable for debugging software created using a flow paradigm.

BACKGROUND OF THE INVENTION

Computer science seeks to simplify the complexity of converting programming goals to functioning software. This has led the development of many high level computer languages and programming paradigms.

A recent approach to programming business related software is premised on modelling the software based on a model of the business procedure on which the software is based. The business procedure is modelled as a set of one or more linked processes or activities that collectively realize the business goal, normally within the context of an organizational structure defining functional roles and relationships. A flow defines the interaction of the processes. During this flow, documents, information, or tasks are passed from one process to another for action, according to a set of procedural rules. For example, considering a credit card application, hiring a new employee, and submitting a loan application may all be so modelled.

Newer high level computer programming paradigms allow the corresponding business related software program to be modelled as the automation of the modelled business procedure, including a well-defined flow of processes. Each process contributes in the solution of the problem, and is treated as a black box. Data is passed between processes; execution of the processes is asynchronous.

One such described computer programming paradigm that facilitates flow programming is referred to as "Workflow Modelling". More information about Workflow Modelling and flow programming may be gleaned from *Business Process Reengineering and Beyond*, IBM Redbook SG24-2590-00; *Workflow Handbook* 1997, John Wiley & Sons, published in association with the Workflow Management Coalition, edited by Peter Lawrence; *Improving Performance: How to Manage the White Space on the Organization Chart*, by Geary A. Rummler and Alan P. Brache, Second Edition, Jossey-Bass Inc., 1995; *Production Workflow: Concepts and Techniques*, by Frank Leymann and Dieter Roller, Prentice Hall, 2000; and *Process Innovation: Reengineering work through Information Technology*, by Thomas H. Davenport, Harvard Business School Press, 1993.

Conveniently, programming tools facilitating flow programming allow a programmer to represent flows as a connected series of processes. Interconnection between the processes represents the exchange of information between the processes. Once the flow is modelled, each process may be implemented in a conventional manner. Each process may, for example, be programmed using a higher level language like Java, C++, Perl, or the like, or may be performed using existing applications having a defined interface. For example, the function of certain processes may be provided by remote web servers using conventional web interfaces like CGI scripts or the like. As well, flow programming allows individual process to execute on different hardware and software platforms that may physically remote from each other. Upon execution, a run-time environment (including run-time code) acts as a flow engine and ensures co-operation between processes in accordance with the flow model. The run-time code typically looks after process execution; inter-process communication; errors; system crashes and the like. Conveniently, programmers and architects need not be concerned about these details as they are handled by run time code.

Known flow based programming environments includes IBM's MQSeries (now IBM's WebSphere); FlexFlow; and Tibco BusinessWorks, available from Tibco Software Inc.

Debugging applications created using the flow programming paradigm presents multiple challenges. For example, debugging should allow meaningful debugging of asynchronous processes and take into account their distributed nature. As well, debugging should be intelligible in light of the underlying flow model used to create the application being debugged.

Clearly then, there is a need for a debugger for debugging applications created using a flow model.

SUMMARY OF THE INVENTION

In accordance with the present invention, a debugger allows debugging of applications using a flow paradigm. Breakpoints may be set based on the flow model. Similarly, variables used by the flow model may be queried. Debugging information may be present in conjunction with a depiction of the application using a flow diagram.

In accordance with an aspect of the present invention, there is provided a method of debugging a software application comprising a plurality of processes that asynchronously co-operate and whose execution is controlled through interaction with run-time code, the method comprising: providing at least one software portion to the run-time code to periodically invoke a debugging component, to debug the software application.

In accordance with another aspect of the present invention, there is provided a method debugging a software application modelled using a flow based software paradigm, the method comprising: querying a run-time software component for information about a flow used by the application; providing a graphical user interface displaying a flow diagram representing the application, using the information; and receiving user input to allow setting of at least one breakpoint in the application using the flow diagram.

In accordance with a further aspect of the present invention, there is provided a computing device, comprising a processor and computer readable memory, the memory storing: run-time software, for executing a software application modelled using a flow paradigm; a debugging component for debugging the software application; a software portion within the run-time to periodically invoke the debugging component.

The invention may be embodied in a computing device, or on a computer readable medium.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention:

FIGS. 9-12; 13A-13B; 14; 15A-15B and 16-17 illustrate a graphical user interface ("GUI") used to debug an application in manners exemplary of an embodiment of the present invention.

DETAILED DESCRIPTION

Figure 1:
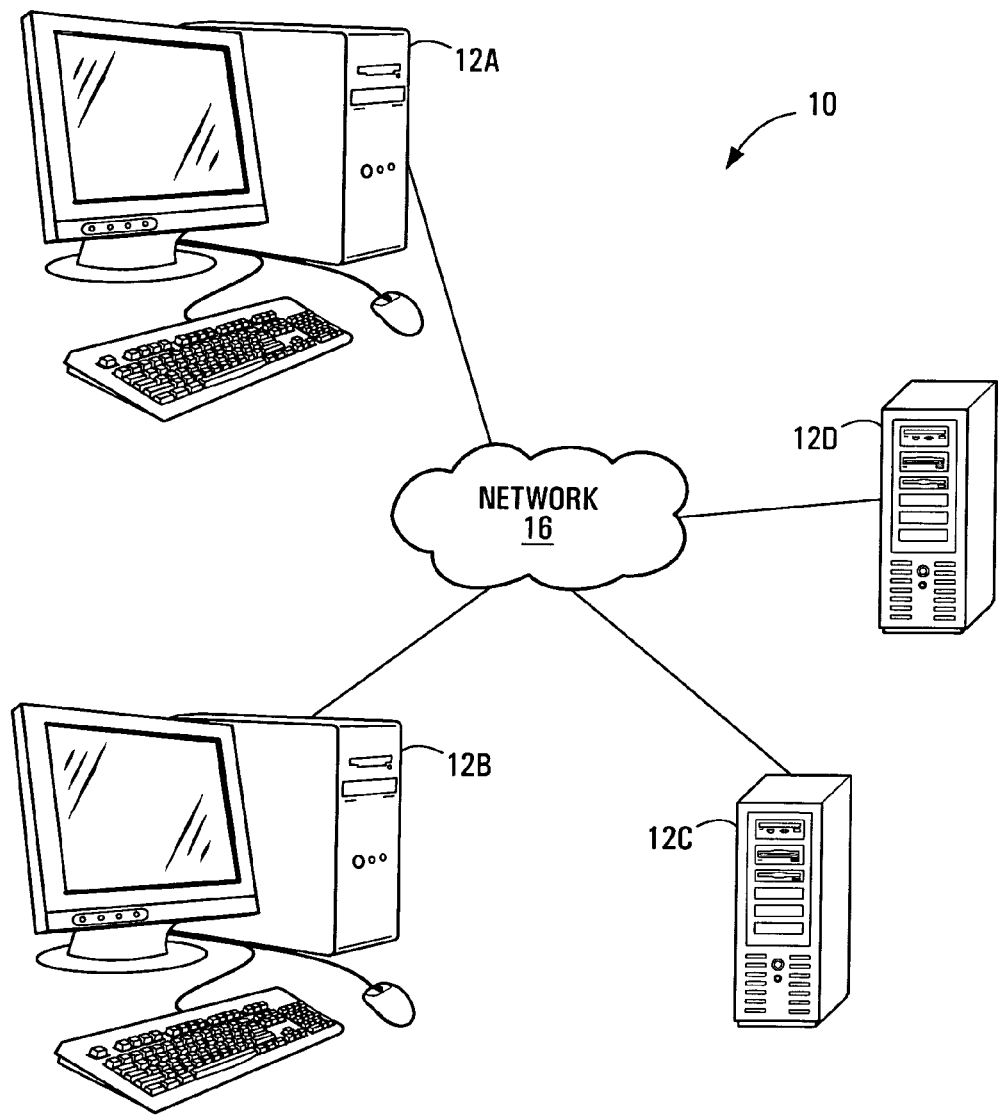
FIG. 1 is a block diagram of a networked computing environment, adapted with software exemplary of embodiments of the present invention.

FIG. 1 illustrates a computing environment 10 suitable for executing software created using a flow model, and debugging software exemplary of an embodiment of the present invention. Computing environment 10 includes a plurality of interconnected computing devices 12a, 12b, 12c and 12d (collectively and individually computing devices 12). Computing devices 12 are interconnected for inter-device and inter-process communication by way of a suitable data communications network 16. Data communications network 16 may for example be a conventional local area network that adheres to suitable network protocol such as the Ethernet, token ring or similar protocols. Alternatively, the network protocol may be compliant with higher level protocols such as the Internet protocol (IP), Appletalk, or IPX protocols. Similarly, network 16 may be a wide area network, or the public internet.

Each computing device 12 may further have access to one or more, additional computing networks and additional computing devices. For instance, each computing device 12 may be interconnected to the public internet by way of a separate network interface (not specifically illustrated) or by way of network 16.

Figure 2:
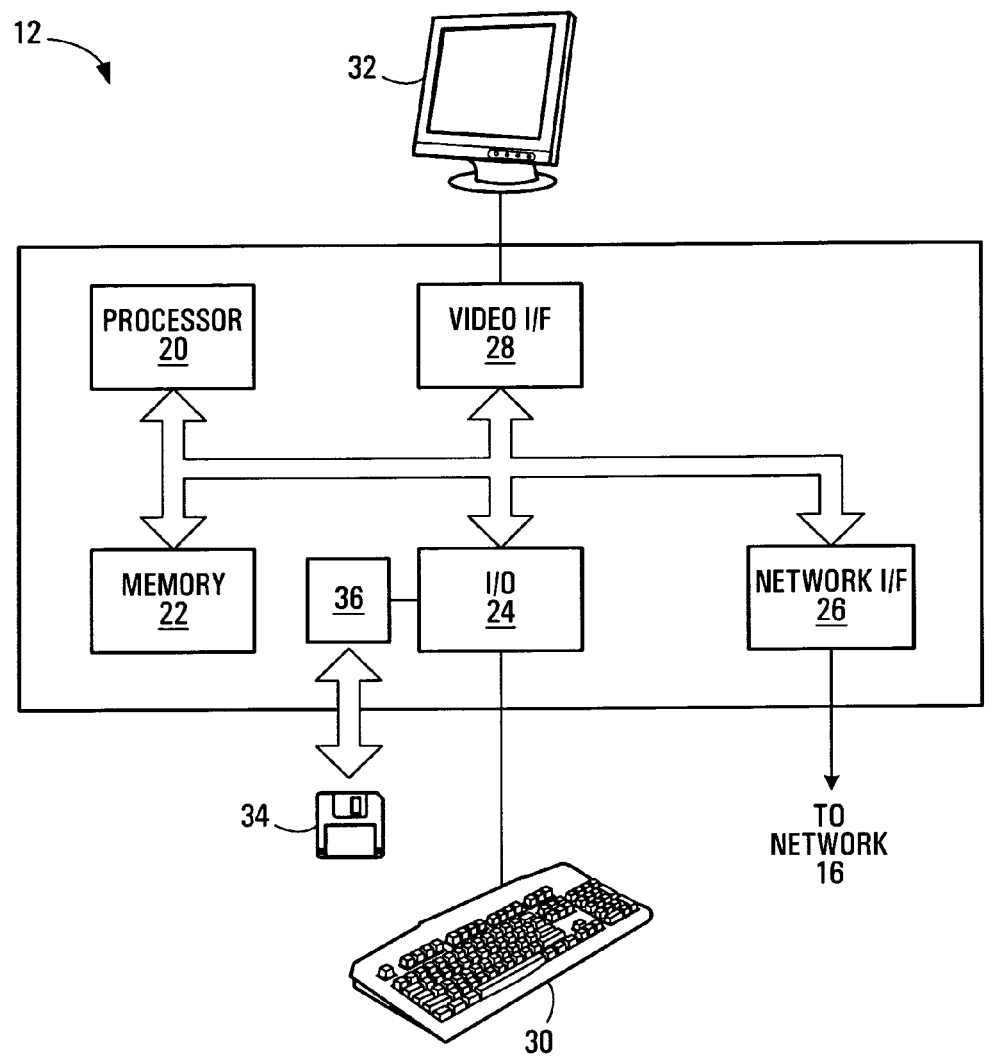
FIG. 2 is a simplified block diagram of a computing device of FIG. 1.

A simplified preferred architecture of an example computing device 12 is schematically illustrated in FIG. 2. In the illustrated embodiment, device 12 is a conventional network capable workstation. Device 12 could, for example, be an Intel x86 based computer acting as a Microsoft Windows NT, Windows 2000, Apple, or Unix based workstation, personal computer or the like.

Example device 12 includes a processor 20, in communication with computer readable memory 22; network interface 26; input/output interface 24; and video adapter 28. As well, device 12 may optionally include a display 32 interconnected with adapter 28; and input/output devices interconnected through input/output interface 24, such as a keyboard 30 and disk drive 36 and a mouse (not shown) or the like. Processor 20 is typically a conventional central processing unit, and may for example be a microprocessor in the INTEL x86 family. Of course, processor 20 could be any other suitable processor known to those skilled in the art. Computer storage memory 22 includes a suitable combination of random access memory, read-only-memory, and disk storage memory used by device 12 to store and execute software programs adapting device 12 to function in manners exemplary of the present invention. Drive 36 is capable of reading and writing data to or from a computer readable medium 34 used to store software and data to be loaded into memory 22. Computer readable medium 34 may be a CD-ROM, diskette, tape, ROM-Cartridge or the like. Network interface 26 is any interface suitable to physically link device 10 to network 16. Interface 26 may, for example, be an Ethernet, ATM, ISDN interface or modem that may be used to pass data from and to network 16 or another suitable communications network.

Figure 3:
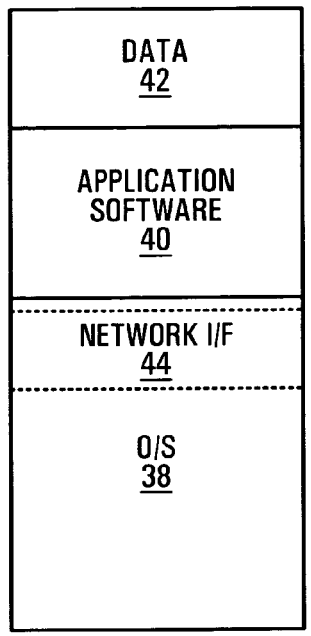
FIG. 3 is a simplified block diagram of memory stored at a computing device of FIG. 1.

An exemplary organization of computer storage memory 22 of device 12 is illustrated in FIG. 3. As illustrated, stored within memory 22 are computer software programs and data that are used by processor 20 to permit device 12 to be operable as network communication capable device. As illustrated, memory 22 stores operating system software 38; application software 40; and data within data portion 42. Operating system software 38 may, for example, be Microsoft Windows NT Workstation operating system software, Microsoft Windows 3.1, 95, 98 or CE software, Apple Macintosh System 7.5 software, UNIX operating system software, or the like. Operating system 38 includes network interface software 44 which typically includes an internet protocol stack allowing communication of device 12 and thus operating system 38 and application software 40 with network 16 (FIG. 1), through physical network interface 26 (FIG. 2). Software 40 includes application software exemplary of embodiments of the present invention. Data within data portion 42 may be stored, processed and retrieved by processor 20 under control of software 40 or operating system 38.

Figure 4:
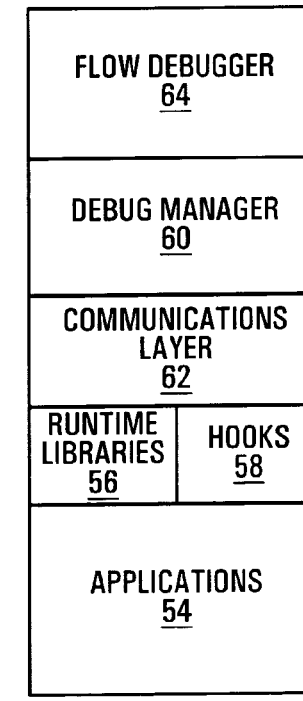
FIG. 4 is a simplified block diagram of the organization of debugging software exemplary of embodiments of the present invention.

Application software 40 exemplary of embodiments of the present invention is more particularly illustrated in FIG. 4. Software created using a flow based model, are stored as applications 54. Further, software 40 includes run-time code 52 that embodies a flow engine used to execute one or more flows defined by application 54. Run-time code 52 typically includes run-time libraries 56 containing code called by applications 54. Run-time code 52 may for example be WMQI run-time libraries; or service flow run-time library; or the like; and other application programs and debugger hooks 58. Possibly, multiple flow engines each associated with their own run-time code 52 may be hosted at a single computing device 12.

Applications 54 may be stored in any variety of ways. For example, IBM WebSphere Studio Application Developer Integration Edition (WSAD-IE) engine allows creation of applications in accordance with the flow paradigm, using a graphical user interface. An example graphical representation defining a flow is for example illustrated in FIG. 5. As illustrated, a flow is represented as a graph 150 of interconnected processes 152, and datamaps 154, each depicted as a node of the graph. Input/output nodes 156 defining storage of data are also depicted. Execution of the flow is governed by interconnections of the processes. Typically, a flow is defined using a graphical editing tool allowing definition of graph 150. The tool allows the graph representing the flow of processes and data to be defined. In the flow depicted in FIG. 5 solid lines define the flow of control, while dotted lines define the flow of data within the flow model. Each node within the flow is completely defined, including the identity of a software application/process that will execute any process, and variables used in the flow to be provided to the process and expected from the process. This is for example, more completely detailed in the programmer documentation for IBM's WSAD-IE.

Figure 5:
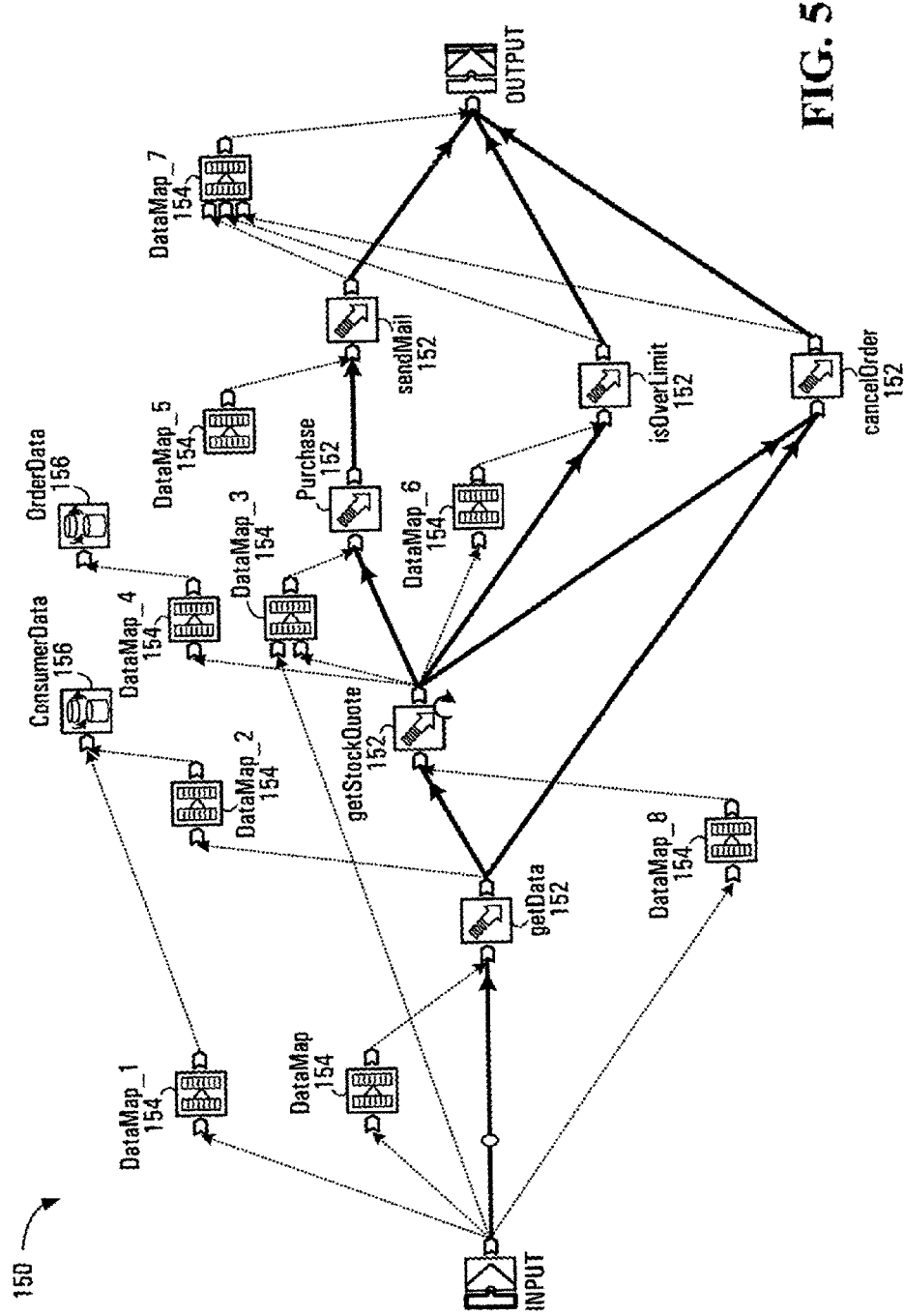
FIG. 5 illustrates a graphical representation of flow, defined for execution at the device of FIG. 4.

Once the flow is defined graphically, as depicted in FIG. 5 it may be converted to executable software in a number of ways. For example, IBMs WSAD-IE software converts the graphically defined flow, into a plurality tokens, each token representative of a node on the graph. The tokens, in turn, may be stored as entries of a database. Each entry containing sufficient information to execute the process or datamap and identifying any interconnection to one or more downstream nodes on the graph. Of course, a person of ordinary skill will readily appreciate that different flow engine software may depict and store applications as flows differently. Debugger software exemplary of the present invention is envisioned to function in association with a variety of different flow programming environments.

Upon execution, flow engine software such as that forming part of run-time code 52 may access the database to extract and interpret the tokens and thereby the details of each defined node, thereby traversing the defined graph; executing the processes of the flow; and passing data between the processes in order to execute the flow. As noted, processes may be distributed across multiple computing devices, and may be executed asynchronously. In computing environment 10 of FIG. 1 processes may executed at any of devices 12a, 12b, 12c or 12d (or other devices not illustrated).

Software 40 (FIG. 4) further includes a run-time debugging component in the form of a debug manager 60, and a debugger communications layer 62, exemplary of embodiments of the present invention. Run-time code 52 includes debugger interface code 58 (in the form of debugger "hooks") that periodically invoke a portion of debug manager 60. Hooks 58 facilitate communication between conventional run-time libraries 56 forming part of run-time code 52 and a debug manager 60 exemplary of an embodiment of the present invention.

In the event that computing device 12 controls debugging in a manner exemplary of the present invention, software 40 includes a flow debugger 64 exemplary of an embodiment of the present invention. Flow debugger 64 includes processor executable code to display and control debugging of applications 54. As will become apparent, flow debugger 64 is typically hosted at a computing device 12 different from the device 12 executing the flow application to be debugged. Communication between flow debugger 64 and debug manager 60 is thus effected through network 16 by way of communications layer 62. Of course, applications 54 and flow debugger 64 could be co-hosted at a single computing device 12, as illustrated in FIG. 4.

For flexibility, the hardware architecture and software at each device 12 (FIG. 1) may be different than the hardware architecture and software at other devices 12. At least one of computing devices 12 includes flow debugger 64, in addition to or instead of run-time code 52 (including run-time libraries 56 and hooks 58), debug manager 60, flow applications 54, and communications layer 62.

Software 40 may be formed in any number of ways appreciated by a person of ordinary skill. For example, debug manager 60; and communications layer 62 may be formed using a computer language such a C++, Java, or the like. The language and associated development tools chosen for the creation of debug manager 60; and communications layer 62 will largely depend on the nature of run-time libraries 56. As hooks 58 are integrated with libraries 56, they are preferably programmed using the same programming environment and language used in the creation of libraries 56.

Figure 6:
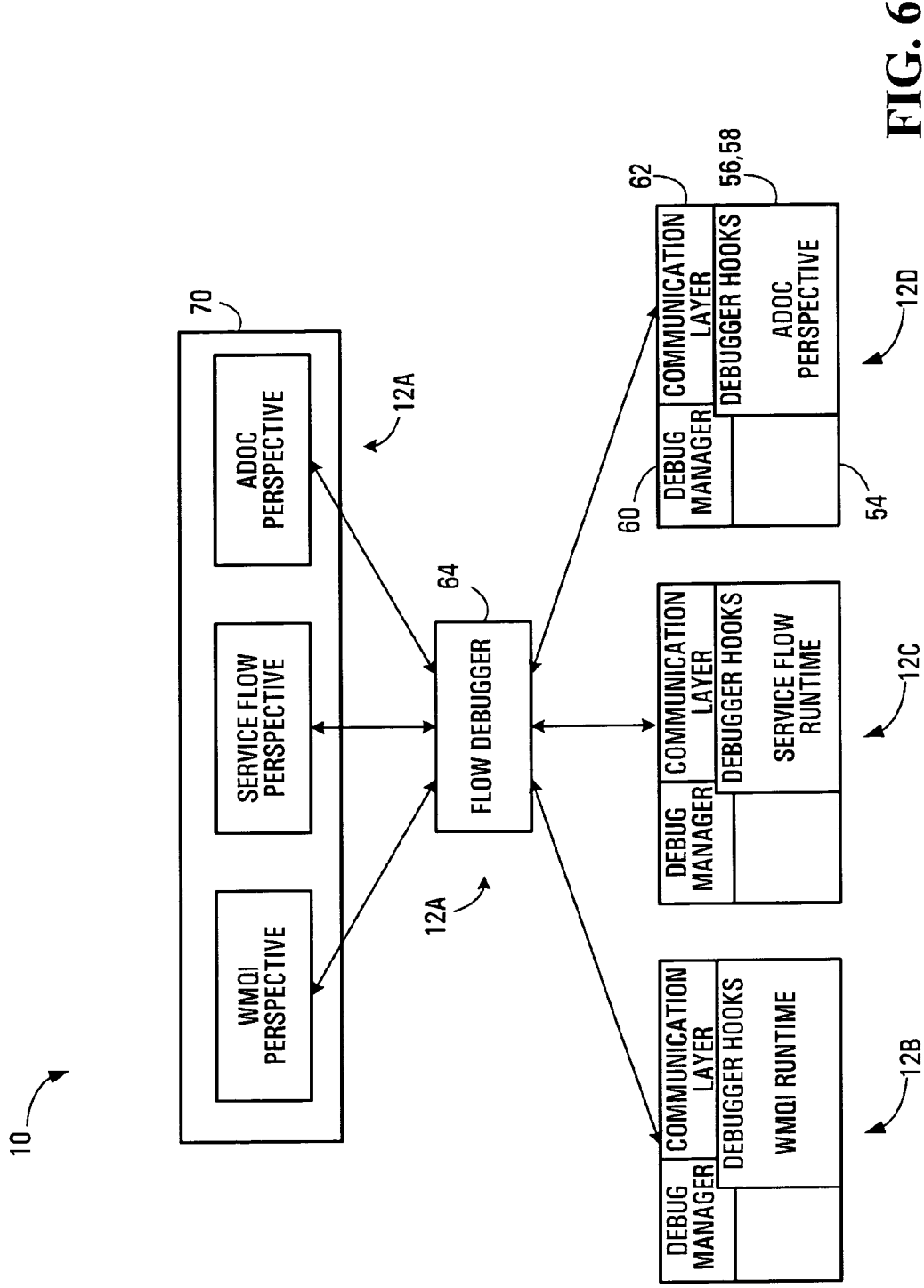
FIG. 6 is a block diagram of software stored within the computing environment of FIG. 1.

The overall software architecture of computing environment 10 of FIG. 1 is again illustrated in FIG. 6. Device 12a is arbitrarily described as hosting flow debugger 64 while devices 12b, 12c, and 12d are illustrated as hosting application software 54 to be debugged. Device 12a hosting exemplary flow debugger 64 may also host an application 54 to be debugged by debugger 64. Devices 12a, 12b, 12c and 12d may also host software used to implement the processes used by defined flows.

As noted, debugger 64 exemplary of the present invention is suited for debugging applications 54 developed using flow based programming techniques. As noted above, flow-based programming models are loosely based on flows of data within between processes in a software application. Such flows are typically asynchronous rather than sequential as in conventional procedural code. Processes providing the software solution are modelled as black boxes. Data is exchanged between the black boxes along predefined connections.

At a high level then, computing devices 12b, 12c and 12d execute flows, defined by software applications 54 through interaction with a flow engine embodied in run-time code 52 which may include necessary libraries (such as libraries 56), interpreters and the like. The actual processes making up the flow may be executed at the computing device 12b, 12c or 12d hosting the associated application 54 or at other computing devices in communication therewith. Run-time code 52 co-ordinates the execution of the processes and communication between the processes.

Additionally, stored and executing at each computing device 12 hosting such an application 54 is a debug manager 60. Debug manager is its own process or thread at a hosted computing device 12. Debug manager awaits interaction form a flow debugger 64 (by way of messages received through communications layer), and control from run-time code 52 (provided by hooks 58).

Flow debugger 64, typically hosted at another one of computing devices 12, in turn, provides debug commands to the debug manager 60 by way of communication layer 62 and further receives debug data for presentation by way of a graphical user interface (GUI) which is detailed with reference to FIGS. 9-17, below.

Debug manager 60 receives program control from an executing application 54 by way of the debugger hooks 58 forming part of the run-time code 52. Data relevant to the application 54 may be exchanged between debug manager 60 and run-time code 52, independent of whether control has been provided to debug manager 60. The debug manager 60 further interacts with the communication layer 62. Communication layer software portion 62 receives and provides debug information and debug commands to the centralized flow debugger 64.

Hooks 58 may, for example, be located at suitable locations within run-time libraries 56. As will be appreciated by a person of ordinary skill, the location of such hooks within run-time code 52 is dictated largely by the nature of the run-time code/environment. The hooks are preferably included in a portion of the runtime that corresponds to changes of state in the nodes of the flow. For example, the hook may be included in portions of the runtime responsible for the start or completion of a process, data mapping or the like.

Figure 7:
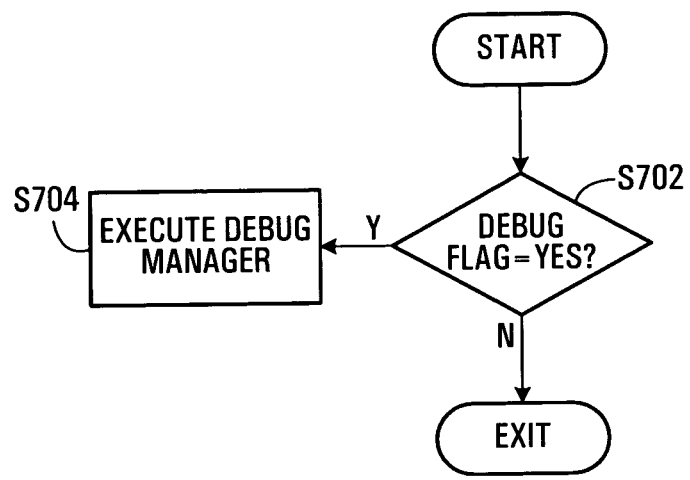
FIG. 7 is a flow chart of steps performed at a computing device of FIG. 1 executing an application to be debugged.

The basic nature of the hook 58 is illustrated by the flowchart in FIG. 7, depicting step S700. Specifically, hook 58 determines whether or not a locally stored debug flag has been set in step S702. If not the hook 58, concludes its functions, exits, and allows execution of the remainder of the application program. If, on the other hand, the debug flag is set, as determined in step S702 a call is made to the debug manager 60 associated with the run-time code 52 of the debugged flow in step S704. Debug manager 60, in turn, determines the nature of its intended response to being called and provides required information to flow debugger 64 by way of debugger communications layer 62. The debug flag may be toggled by flow debugger 64 to initiate or terminate debugging at a particular debug manager 60. In the disclosed embodiment only a single flag debug flag is used to control initiation of debugging by way of hook S700.

Figure 8:
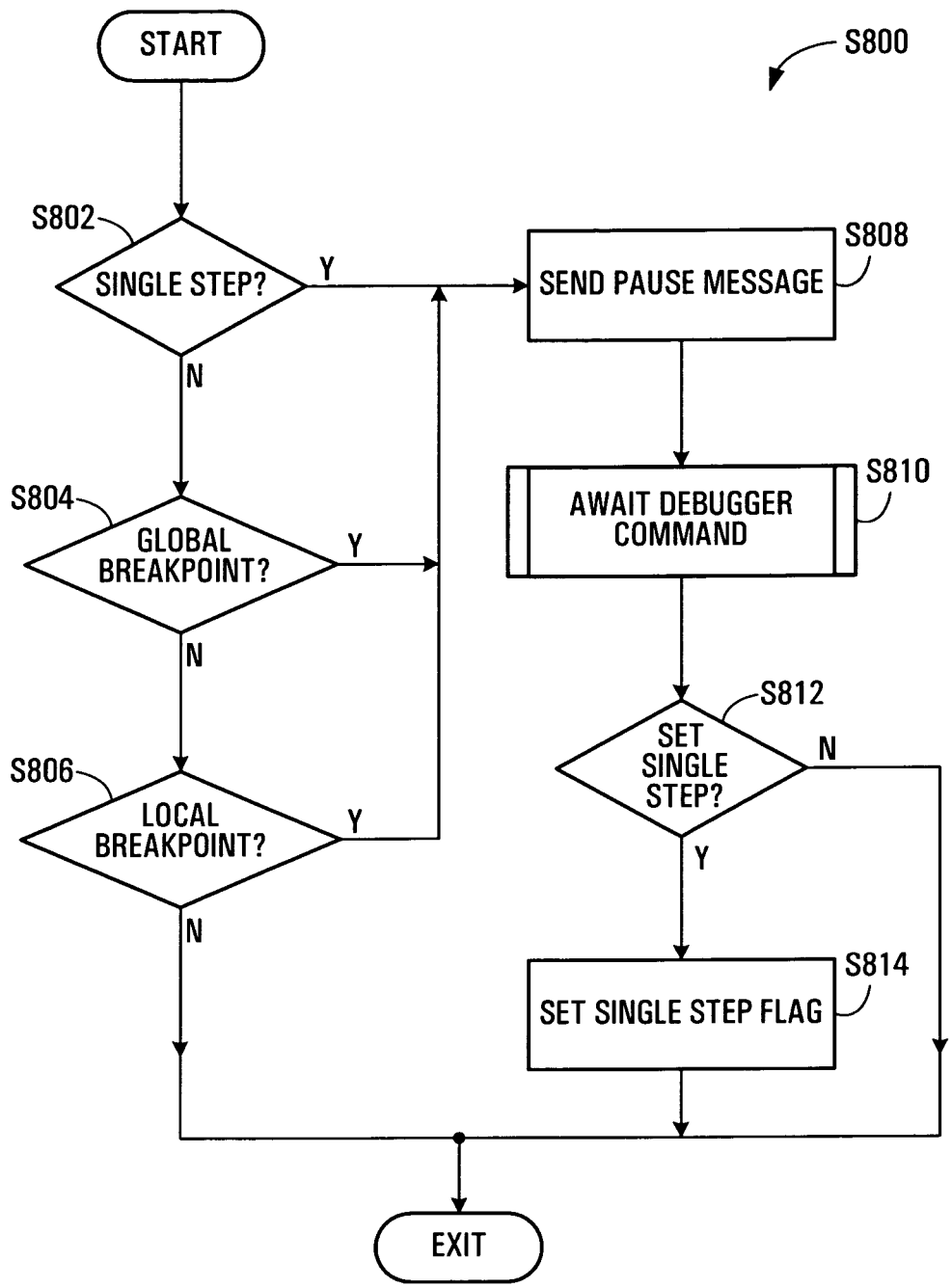
FIG. 8 is a flow chart of steps performed at a computing device of FIG. 1 executing debugging software exemplary of embodiments of the present invention.

An example hook 58 for IBM's WebSphere (MQIntegrator) run-time libraries may be located in a class that corresponds to a terminal in flow. For this run-time environment no additional hooks are required. Example C++ code associated with the hook, may take the form:

//VFD_HOOK
if (iDebugFlag==1)
//1. If the debug flag is on
callVisualFlowDebugAPI ((*i).first, messageAssembly);
else
//2. If the debug flag is off
(*i).first→evaluate(messageAssembly);

Similarly, if run-time code 52 includes IBM's ServiceFlow run-time libraries several hooks within the libraries may be required. Specifically, the hooks may be included in the Java class in the runtime that is associated with the ActivityState for activities that are currently inactive, but are about to become active. The hooks may all be of the same basic nature, illustrated by this example hook, //WGO VFD_HOOK
if (engine.getTom( ).getDebugFlag( )==true)
inputMsgsForDataMap=
engine.getTom( ).getDebugAPI( ).predebugMap(activity, inp
utMsgsForDataMap,inComingDataConns);
*engine procedure for mapping*
//WGO VFD_HOOK
if (engine.getTom( ).getDebugFlag( )==true)
inputMsgData=
engine.getTom( ).getDebugAPI( ).postdebugMap(activityinputMsgData);

Hook 58 thus transfers control from run-time code 52 to debug manager 60 as required. Steps performed by debug manager 60 in response are illustrated in FIG. 8, and are detailed below. The reactions of hook 58 and debug manager 60 depend on debugger parameters (stored as variables used by the debugger) set by flow debugger 64. In this way, application 54 can be controlled and debugged by the flow debugger 64 through run-time code 52.

As required, data may also be provided to run-time code 52 and/or application 54 based on messages provided to debug manager 60 by flow debugger 64. Similarly, data is provided by debug manager 60 to flow debugger 64. Communication between run-time code 52 and debug manager 60 may, for example, be facilitated through Application Program Interfaces (APIs) in run-time code 52. Alternatively, run-time code 52 could be suitably modified to otherwise communicate with debug manager 60.

Messages exchanged between debug manager 60 and flow debugger 64 may be exchanged over network 16 (FIG. 1) using communication layer 62. For example, such messages may be encapsulated in TCP/IP packets.

As noted, messages between application 54 and debug manager 60, and flow debugger 64 and debug manager 60 are exchanged independently of the execution of hooks 58 and of steps S800.

Example messages provided by debug manager 60 to flow debugger 64 may be summarized, as follows:

PAUSE Flow_Point_Info (Data) sends information identify a paused point within the flow (i.e. location where the flow is paused) and data to the flow debugger 64;

GROUPDATA Group_List Data sends a group of related data to the FlowDebugger. One reason for so sending data is in response to the QueryData message, detailed below;

FLOWTYPES Flow_Engine_Info FlowTemplates_List provides a list of deployed flow types to the flow debugger 64 to be displayed to the user by the flow debugger;

ERROR Error_message signals an error condition that has occurred in the runtime. For example, debug manager 60 may detect that a fault has occurred in the running code (perhaps a null pointer exception, for example) and may send a notification to the user that this has occurred;

DONEDEBUGSESSION Flow_instance_info signals completion of a given flow instance, and is no longer available for additional debugging.

In summary then, using these messages, debug manager 60 informs flow debugger 64 when a flow has paused, and what data values to display. Debug manager 60 also responds to requests regarding what flows in applications 54 are deployed and what instances have been created therefrom. Debug manager 60 may further provide error messages to flow debugger 64 and may indicate when an instance of a flow application 54 has completed.

Similarly, flow debugger 64 provides messages to debug manager 60 to govern its execution or to extract or provide information from or to run-time code 52 and thereby application 54. Generally, the following message types are provided to the debug manager 60 by flow debugger engine 64,

| Flow Debugging Engine→ | Run-time | |
|---|---|---|
| Resume | Mode | |
| AddBreakpoint | Flow_Point_Info | |
| RemoveBreakpoint | Flow_Point_Info | |
| EnableBreakPoint | Flow_Point_Info | |
| DisableBreakpoint | Flow_Point_Info | |
| Configuration | Flow_Engine_Info | Data |
| StartDebug | Flow_Engine_Info | |
| StopDebug | Flow_Engine_Info | |
| QueryData | Flow_Point_Info | |
| UpdateData | Flow_Point_Info | |
| Retrieve FlowTypes | Flow_Engine_Info | |

The Flow_Point_Info includes Flow_Type_Info or Flow_Instance_Info Position identifying points within a flow. Flow points identify points within an executing flow application, as understood using the flow paradigm. Similarly, Flow_Engine_Info identifies a flow engine of interested hosted at an identified computing device. MODE, in turn, specifies whether a flow is to run to completion or simply step.

So, flow debugger 64 instructs debug manager 60 to set breakpoints and toggle their current state (disabled or enabled) using the AddBreakpoint; RemoveBreakpoint; EnableBreakPoint; and DisableBreakPoint messages. Flow debugger 64 similarly instructs debug manager 60 to resume program execution using the Resume message. The flow debugger 64 will provide run-time code 52 data in the case that the user has changed the message in the message display. Flow debugger 64 may also provide configuration data to debug manager 60 using the Configuration message. In addition, upon user request, debug manager 60 may query the run-time code 52 for data using the QueryData message. If a user has changed the message, the run-time is informed using the UpdateData message. StartDebug and StopDebug messages toggle the debug flag used by hook 58, thus informing debug hook 58 when debugging has started and stopped.

Finally, the RetrieveFlowTypes message causes debug manager 60 to query run-time code 52 for information on flow types and instances.

As will become apparent, breakpoints are set and values are queried based on the underlying flow model used to define application 54. In this way, a programmer is able to debug an application based on the model used in its creation.

The values of debugger variables whose values are set by debug manager 60 or flow debugger 64 are stored locally with debug manager 60 for its further use during execution.

Operation of flow debugger 64 may be better appreciated with reference to FIGS. 7-8 and FIGS. 9-16 illustrating GUI 70 presented at device 12a as a result of execution of flow debugger 64, in response to interaction with debug manager 60 at various computing devices 12b, 12c, or 12d, as for example illustrated in FIGS. 1 and 2. GUI 70 is capable of presenting debug views particular to, and adapted to the particular run-time environment being debugged. Debugging multiple applications 54 in multiple run-time environments, potentially concurrently, is contemplated. GUI 70 may present multiple debug views, one corresponding to each environment. In the illustrated embodiment GUI 70 is presented at the computing device 12a executing debug manager 60. Of course, this GUI 70 could be presented at a remote device.

Figure 9:
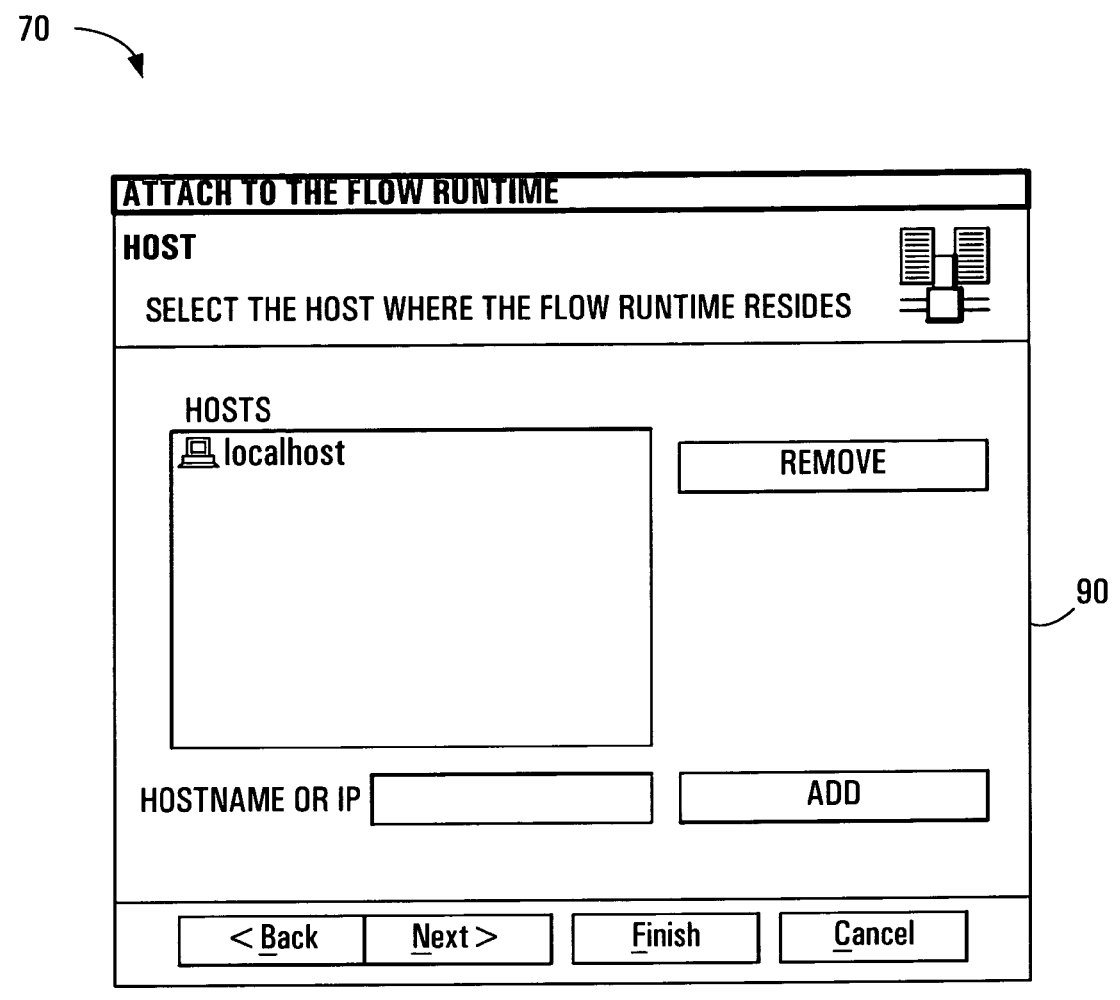

As illustrated in FIG. 9, flow debugger 64 initially presents a dialog 90 to attach to a known one of computing devices 12a, 12b, 12c, and 12d executing run-time code 52. The computing device may be local to flow debugger 64 or remote, identified by a network address. In response to selecting a computing device 12, flow debugger 64 queries this computing device 12 using a protocol address directing communications to communications layer 62 thus providing the request to debug manager 60 of the computing device 12 of interest. Flow debugger 64 dispatches a message to debug manager 60 to identify hosted run-time code, using for example a well know IP port.

Figure 10:
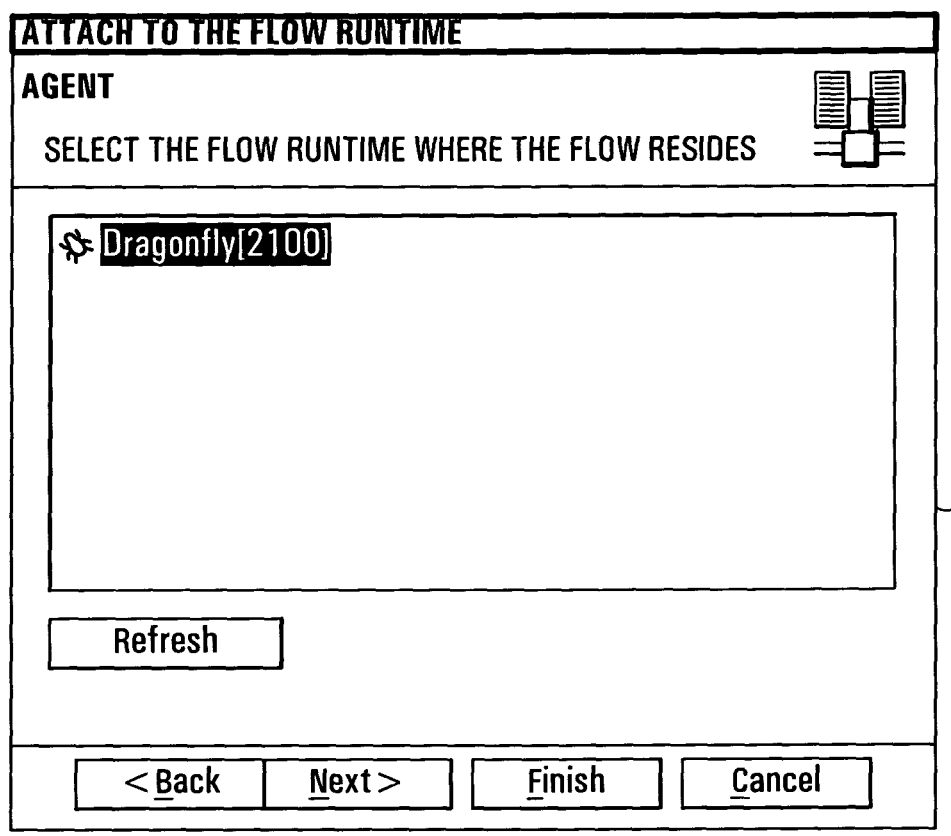

In response debug manager 60 by way of communications layer 62 at the identified computing device, provides flow debugger 64 a list of flow engines (implemented by run-time code 52) hosted at the queried computing device. Flow debugger 64 presents dialog box 92 identifying these, as depicted in FIG. 10. As will be appreciated, computing devices 12 need not be queried directly. Instead communications layer 62 of each computing device 12 may register flow engines (implemented by run-time code 52) with a central repository that may be queried by flow debugger 64.

As desired, a user may select multiple computing devices 12 executing one or more flow engines by way run-time code 52 for simultaneous debugging.

Figure 11:
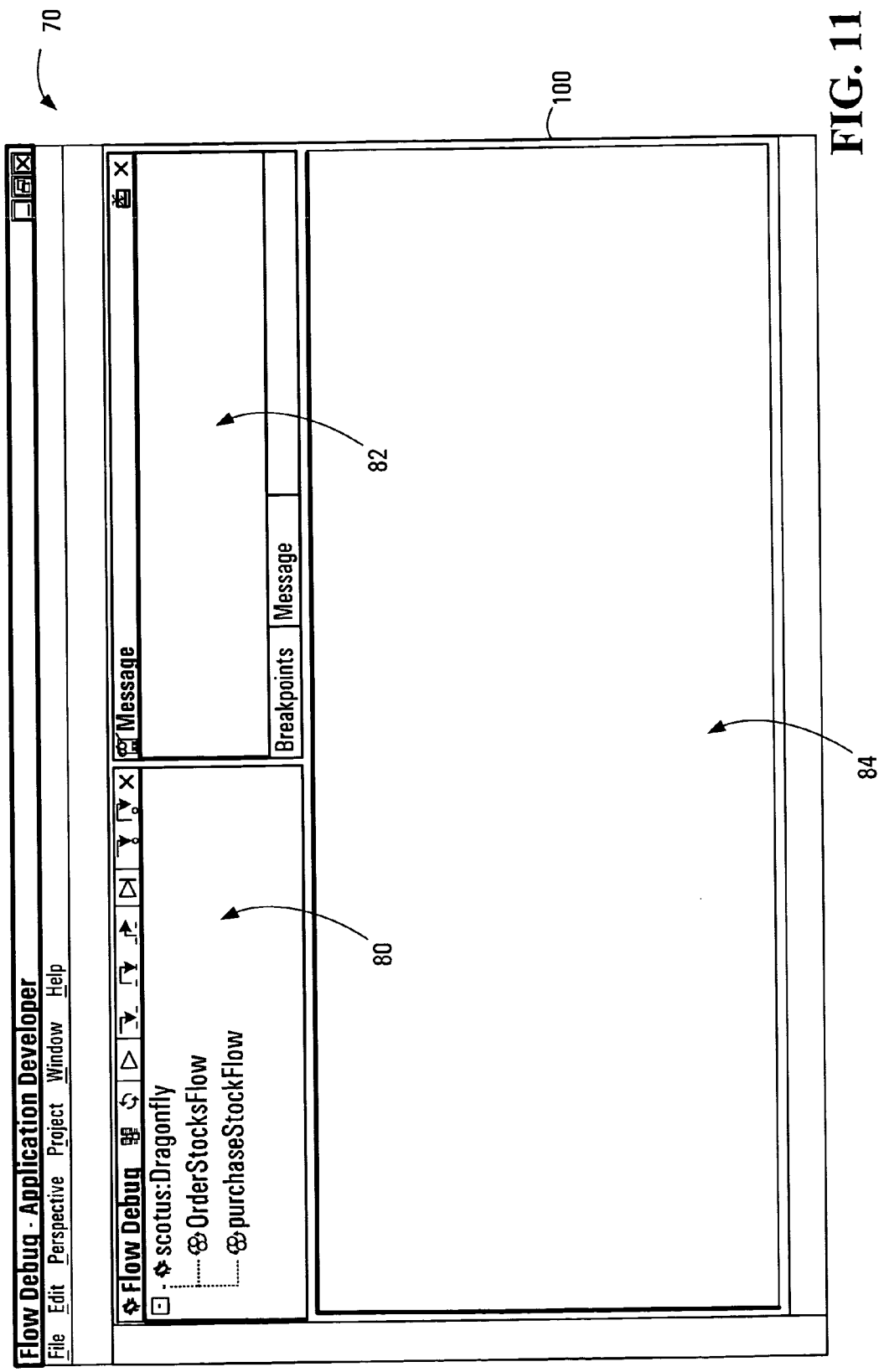

Once a flow engine has been selected, debug window 100 including panes 80, 82 and 84 are presented by flow debugger 64, as illustrated in FIG. 11. As will become apparent, pane 80 is used to present instances of flows running under the identified run-time code 52; pane 82 displays messages exchanged with the run-time code 52, and set breakpoints; and pane 84 is used to graphically depict the flow using, using for example flow or flow composition, or similar notation.

Figure 12:
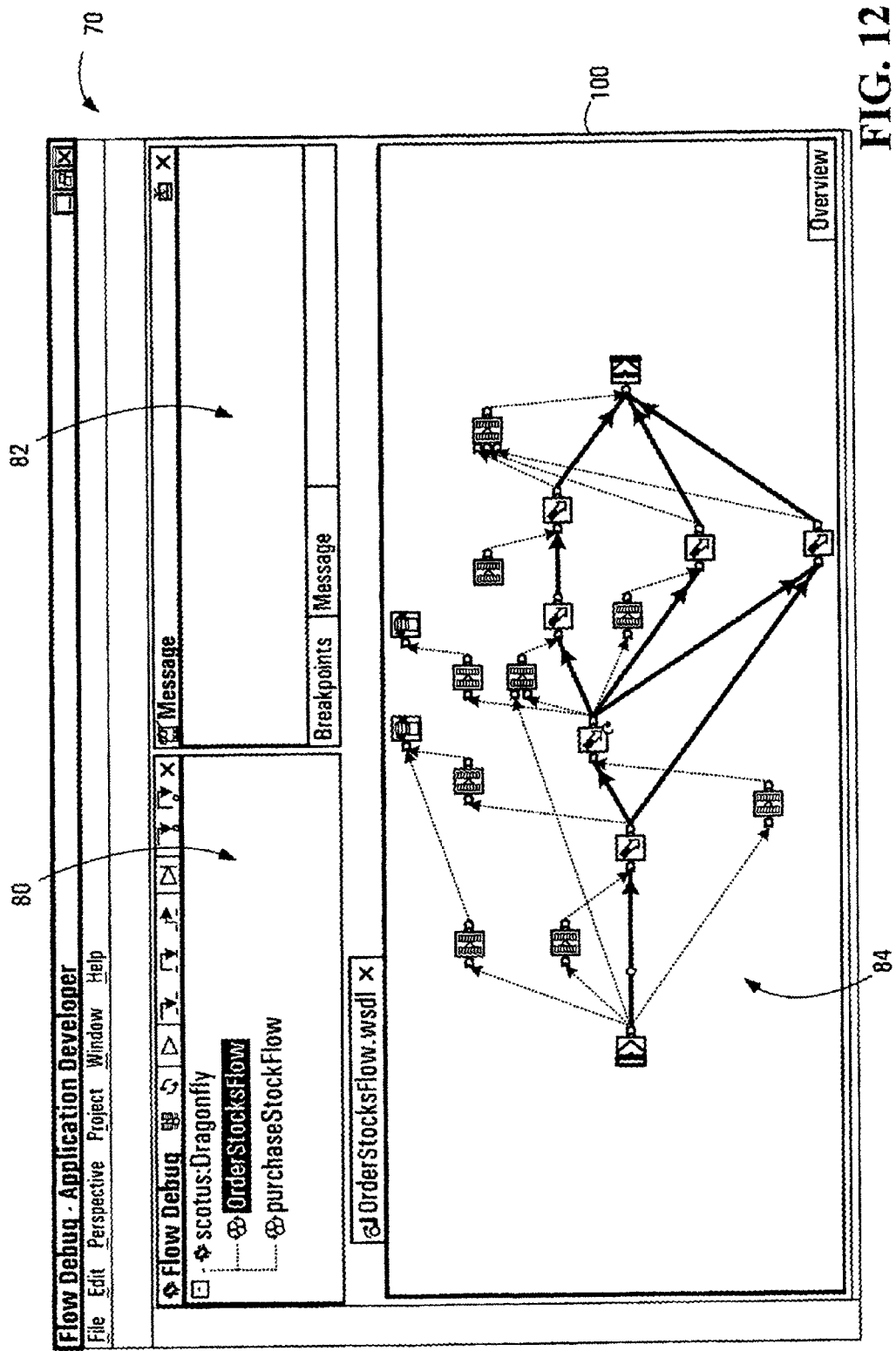

As well, once a flow engine has been identified by name, details about flows (defined by applications 54) may further be queried by debugger 64. Specifically, flow debugger 64 dispatches a RetrieveFlowTypes message identifying the flow engine of interest and thereby queries run-time code 52 for any named flows hosted by run-time code 52. Flow engine of run-time code 52, may for example query tokens representative of the identified flow and provide these to debug manager 60, which in turn provides these to flow debugger 64. Preferably, retrieved tokens include sufficient information reflecting naming conventions used in the creation the flow. Alternatively, run-time code 52 may store a symbol table to allow translation of information contained within stored tokens to names used in the creation of the flow. In either case flow debugger 64, in turn, may reconstruct the flow as defined by the tokens. Thus, for any available flow, sufficient information is provided to flow debugger 64 to graphically reconstruct the flow in panel 84, of GUI 70 as illustrated in FIG. 12. As illustrated, the reconstructed flow preferably takes the form of a graph, resembling the graph used to originally define the flow (i.e. as illustrated in FIG. 5). An end user operating flow debugger 64, is thus capable of viewing the debugged flow in flow notation, in much the same way as the flow was created.

Figure 13A:
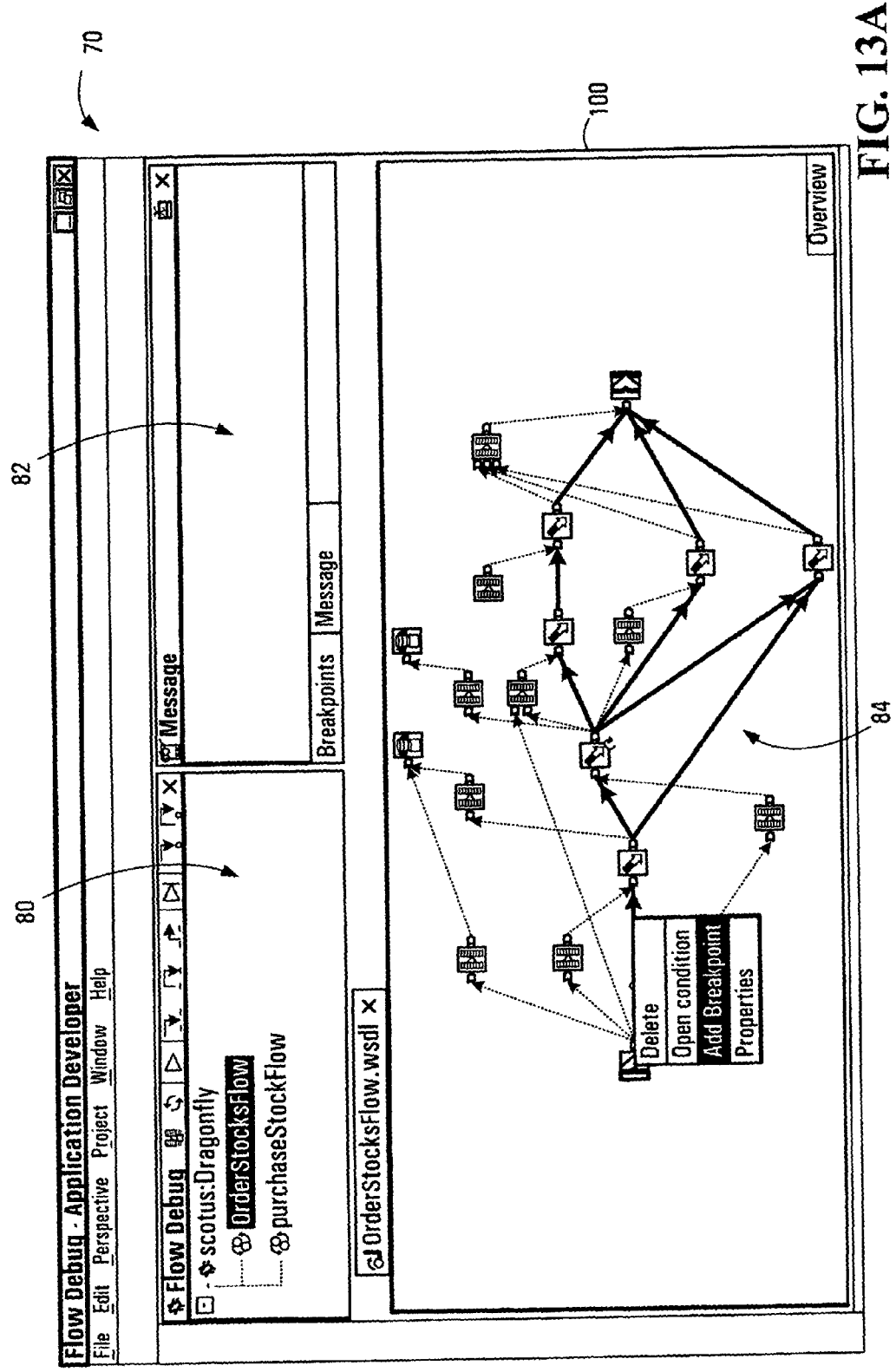

Using the graphical depiction of the identified flow in GUI 70, a user may now use flow debugger 64 to debug the flow. Flow debugger 64 allows the user to add break points; to query values of variables used by the flow; to resume execution of the flow; to single step the flow or the like through the exchange of messages detailed above. Specifically, a user may set a breakpoint at computing device 12a by interacting with GUI 70 of flow debugger 64, depicting the flow. The breakpoint may for example be set by clicking on the process of interest in pane 84, as illustrated in FIG. 13A. Once a user sets a breakpoint, a corresponding message AddBreakpoint is sent to the debug manager 60 by way of the communications layer 62 associated with the flow being debugged, and identifies the breakpoint as reflected in GUI 70. Debug manager 60, in turn, locally stores the identified breakpoint for later use. An arbitrary number of break points may be so set. Breakpoints once set may be removed, enabled and disabled at flow debugger 64. Debug manager 60 is likewise provided with messages reflecting these changes. Messages RemoveBreakpoint, EnableBreakpoint and DisableBreakpoint are respectively sent from flow debugger 64 to debug manager 60. The EnableBreakpoint may further identify that debugging of a breakpoint is to be single stepped. Associated status information is also stored for local access by debug manager 60. Flow debugger 64, in turn, displays set breakpoint in frame 82 of GUI 70, as for example illustrate in FIG. 13B.

Figure 13B:
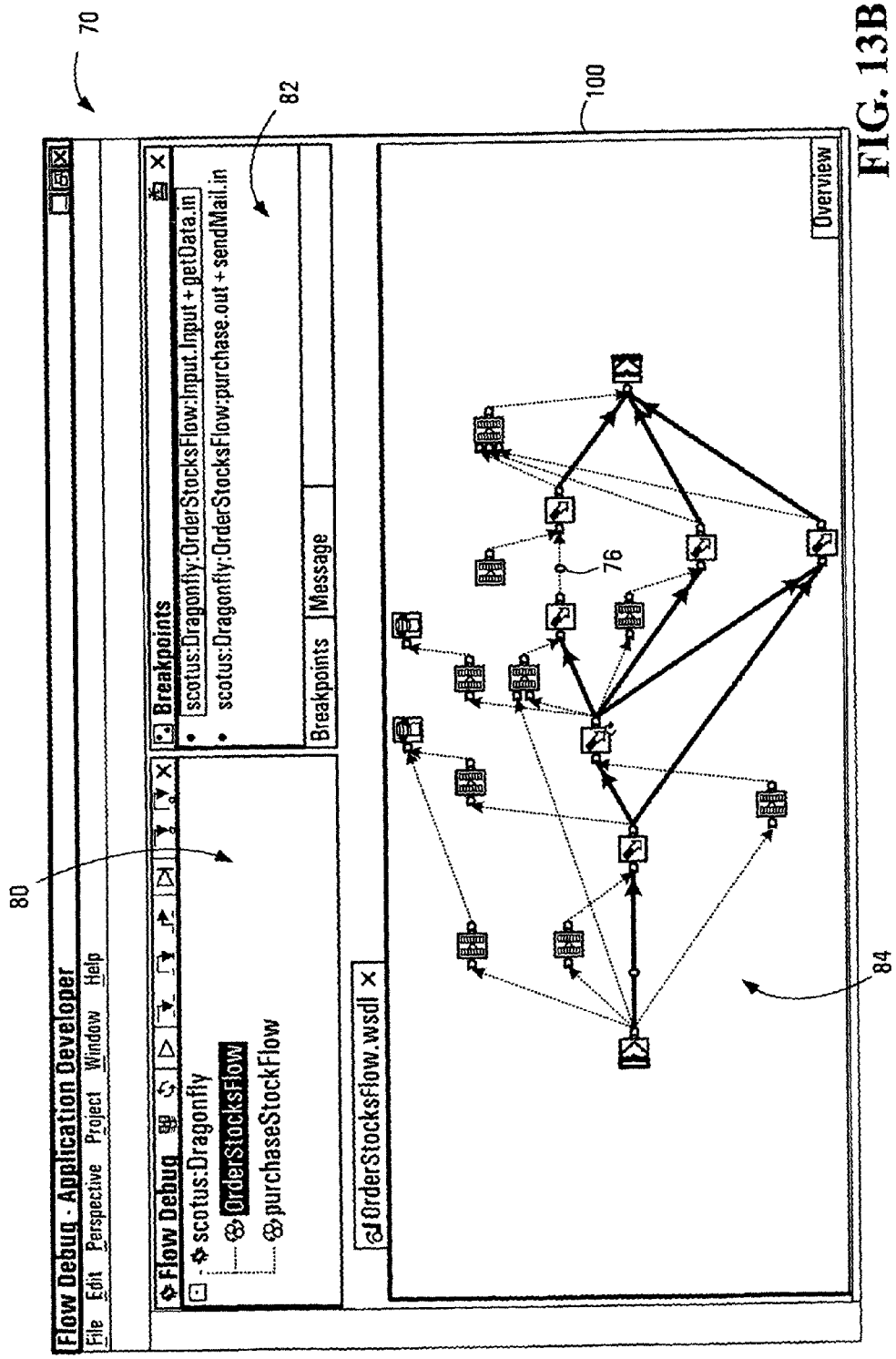

At flow manager 64, GUI 70 is further updated to reflect the set breakpoints. As illustrated in FIG. 13B an indicator 86 in the form of a dot or the like is depicted in proximity to the flow process step for which the breakpoint has been set. Once set, the breakpoint may be modified, enabled or disabled at the GUI 70 by clicking on indicator 86.

Upon execution, once a flow is to be debugged, debugging is toggled at GUI 70, and global debug flag is set at the debug manager 60 by way of the StartDebug message. Hook 58 (steps S700, FIG. 7) for the run-time code 52, in turn exits to debug manager 60 in step S704 each time the hook is encountered in step S702. Debug manager 60, in turn compares the point of execution with the set breakpoint. FIG. 8 illustrates steps S800 performed by debug manager 60, once control is passed to it in step S704 by hook 58.

Specifically, as illustrated in FIG. 8 steps S800 are performed each time the hook S700 invokes debug manager 60. As illustrated, debug manager 60 initially determines whether it has been invoked at a breakpoint within the flow identified as being single step debugged in step S802. This may, for example be done by comparing the identity of the current node to stored breakpoints. If the application is executing at a breakpoint, a further comparison may be made to assess if the breakpoint is identified as a single step location. In IBMs WMQI the currently executed node of the flow may for example be identified by using the name of the most recently interpreted token. If this node name equals the node name of a node marked as being debugged, single step, the debugger reacts accordingly. That is debug manager 60 sends an indicator that it has paused in single step mode to debugger 64 in step S808.

If the debugger has not encountered a location that is being single stepped, it next assesses whether or not it has been invoked at a location identified as a global or local breakpoint in steps S804 or S806. Again, breakpoints may be identified by way of nodes in the defined flow, and compared to the names of tokens being interpreted. If a breakpoint is encountered, debug manager 60 may again dispatch a message indicating the application has been paused to flow debugger 64.

Once the debug manager 60 pauses execution of a flow being debugged, debug manager 60 waits to receive a suitable message indicating it should continue from debugger 64, in step S810. In the event, the message from debugger 64 identifies that a user wishes to single step through the debugged application, as determined in step S812, the single step flag for the breakpoint is set in step S814 for further use in step S802.

Figure 14:
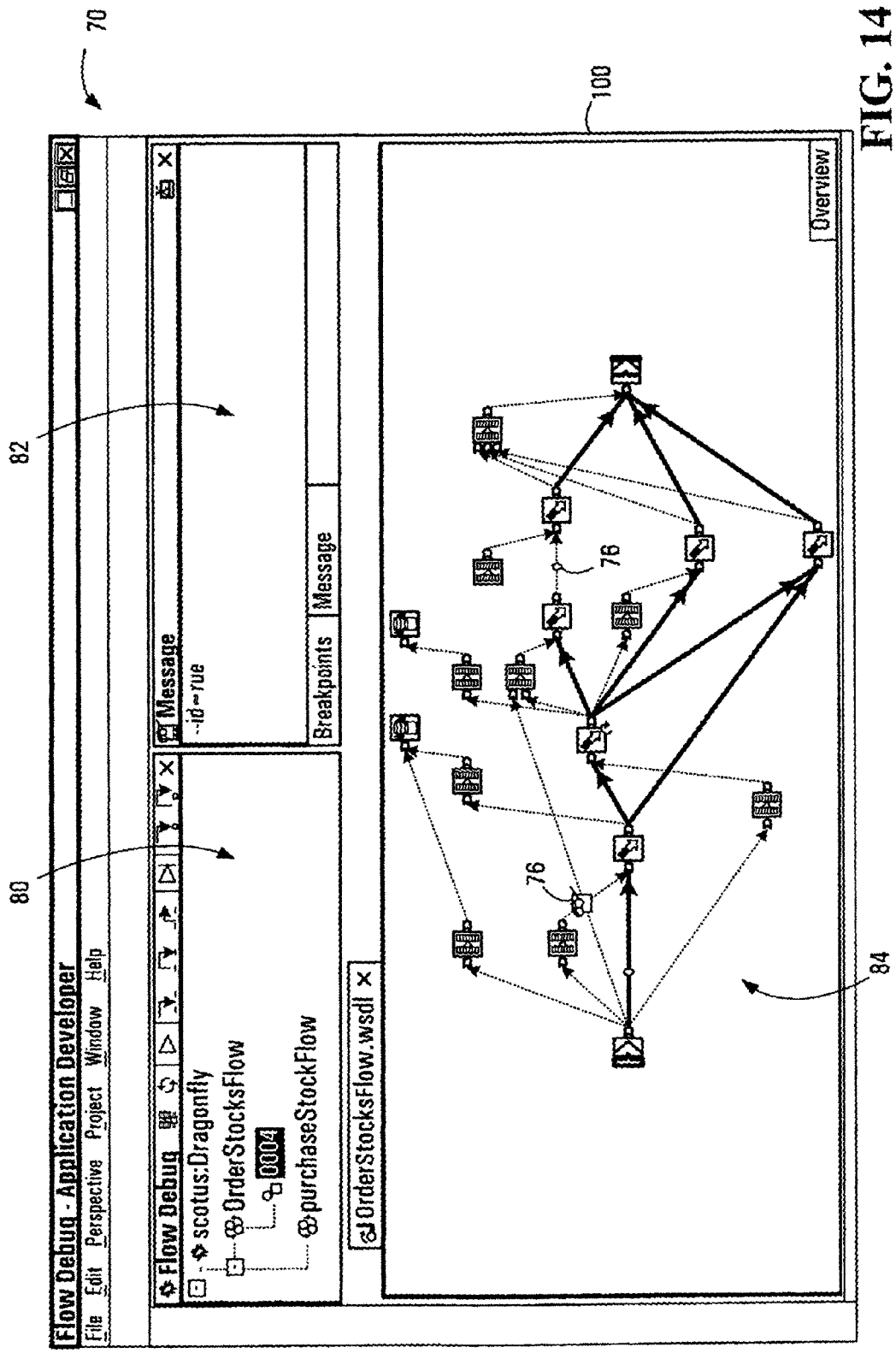
Figure 15A:
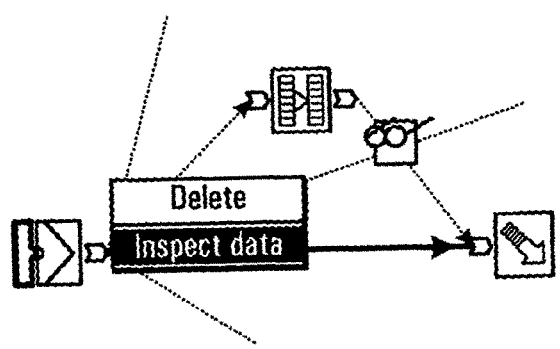
Figure 15B:
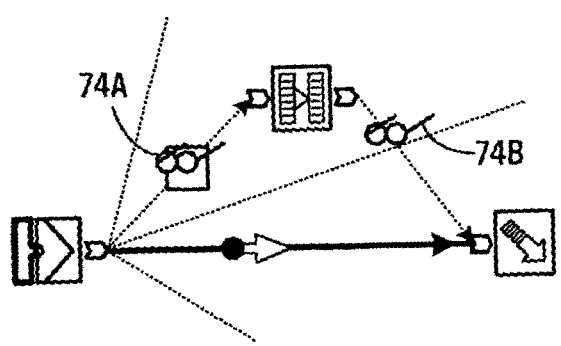

Flow debugger 64, in response to receiving the PAUSE message from debug manager 60 updates GUI 70 as illustrated in FIG. 14 to indicate the breakpoint has been reached. Specifically, icon 76 is presented in proximity to the process for which the breakpoint has been encountered. At this point, control of execution of flow application 54/run-time code 52 rests with associated debug manager 60. Once the flow has been paused, a user is given control to further query the debugged flow by way of flow debugger 64. That is, the user may query the stopped flow using suitable interaction with GUI 70. This is for example illustrated in FIGS. 15A-15B.

In response to querying additional information, a suitable message is dispatched from flow debugger 64 to communication layer 62 and thus debug manager 60 associated with the flow being debugged. Suitable commands may be the QueryData command, causing the debug manager 60 to query run-time code 52 for the identified data and provide it to flow debugger 64 as part of a GROUPDATA message response containing information about values of queried variables. Again, flow engine of run-time application 52 may provide the queried values as identified in tokens defining the flow. Alternatively, a symbol table may be used by debug manager 60 or flow engine of run-time 52. Similarly, variables may be updated by flow debugger 60, through input of desired values at GUI 70. One or more corresponding UPDATEDATA message(s) are dispatched to debug manager 60 from debugger 64 in step S810. Debug manager 60, in turn, updates the corresponding variable used by the flow as required used by flows defined by applications 54. Data, can typically only be updated if the value is to be passed on in the flow. As such, representative icons 74*a* and 74*b* illustrate that data may be queried at both inputs and outputs to the flow. Only those at outputs may be updated.

Similarly, while at the breakpoint, user may control further execution of the debugged process through the input of suitable commands, resulting in the dispatch of RESUME "Run"; "Run to Completion" or "Step" messages from flow debugger 64 to the debug manager 60 as detailed above. The RESUME "Run" command simply causes the debug manager 60 to mark the current breakpoint as debugged; the "Run to Completion" clears all breakpoints beyond the current breakpoint.

The "Step" message may take two forms: the "Step Over" contrasts with the "Step Over Source" option which is available at times. The former, causes debugger 64 to instruct debug manager 60 to cause run-time 52 to continue execution of the next process within the flow. The latter choice causes the debug manager 60 to again dispatch a message, the next time hook 58 invokes steps S800, enabling the user to step over smaller-grain pieces of logic in the flow, logic that is usually associated with source code (typically written in Java or the like).

Figure 16:
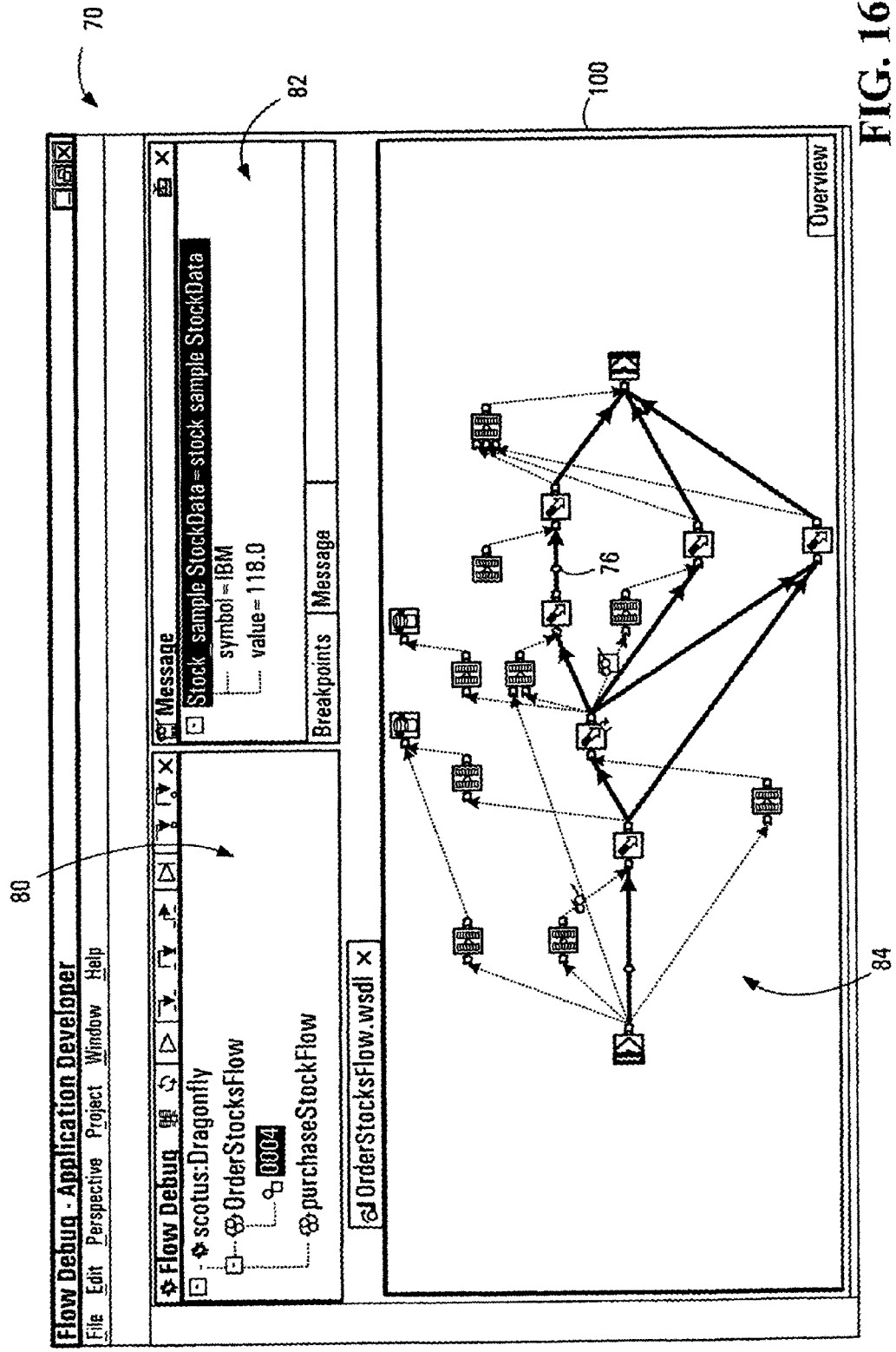
Figure 17:
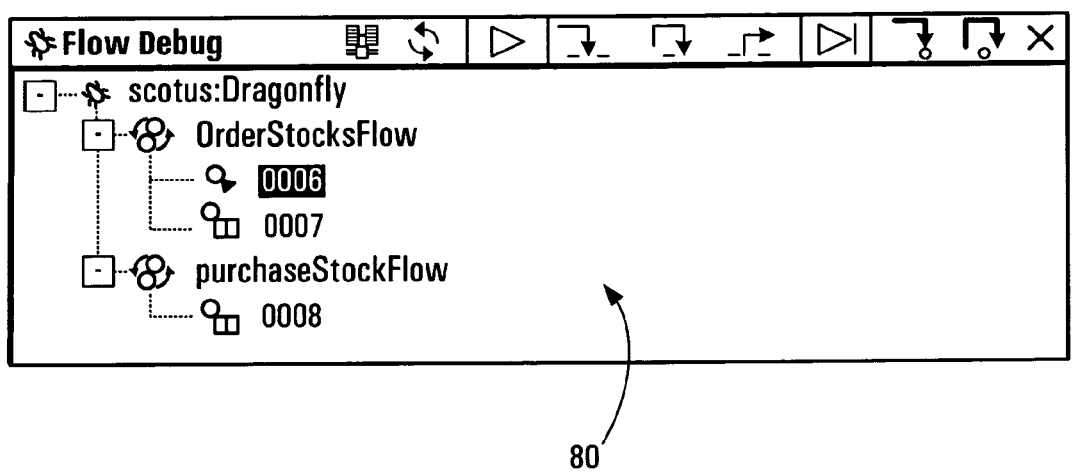

Values of queried variables used by the flow are displayed by debugger 64 in pane 82, as illustrated in FIG. 16.

In addition to simultaneously debugging multiple flows, debugger 64 may debug multiple or individual instances of a single particular flow concurrently. That is, upon receiving identifiers of executing flows, multiple instances of like flows are separately identified in pane 80, as for example illustrated in FIG. 17. As such, breakpoints may be set for individual instances of the flow or for all instances of the flow. Thus, a breakpoint may be set at the flow (class) level or at the instance level. If a breakpoint is set at the flow level, all instances of that flow are subject to debugging at the breakpoint. If the breakpoint is set at the instance level, only that instance will cause debug manager 60 to react. Debug manager 60 tracks whether or not the breakpoint is set for the flow or instance level in step S804/S806. Toggling between instances may be effected by choosing identified flows within pane 80.

Advantageously, breakpoints and queried variables are identified with reference to the underlying flow model used to form application 54. Conveniently, hook 58 is inserted into the run-time 52 so that steps S700 (FIG. 7) are performed frequently providing a constant exit to the debug manager 60. Flows using multiple processes distributed across multiple computing devices may conveniently be debugged by way of run-time code 52 co-ordinating distribution of processes and inter-process communication.

Of course, the above described embodiments are intended to be illustrative only and in no way limiting. The described embodiments of carrying out the invention are susceptible to many modifications of form, arrangement of parts, details and order of operation.

For example, illustrated flows have been exemplified using IBM's WSAD-IE applications. As will be appreciated, equivalent flows may be depicted in numerous ways. Corresponding run-time applications 54 may similarly store and execute flows in numerous ways, and need not use a database structure.

The invention, rather, is intended to encompass all such modification within its scope, as defined by the claims.

What is claimed is:

1. A computer-implemented method of debugging a software application comprising a plurality of processes that asynchronously co-operate and whose execution is controlled through interaction with a runtime code, the method comprising:
    constructing, using the runtime code, a flow diagram to represent the software application as a flow;
    inserting at least one debug command in at least one location into the flow;
    executing the software application, the at least one debug command being executed when execution of the application software reaches the at least one location in the flow where the at least one software command is inserted, wherein the at least one debug command is a step over source command, the step over source command inhibiting logic associated with source code to be executed; and
    returning a result upon execution of the at least one debug command.

2. The computer-implemented method of claim 1 wherein the at least one debug command is executed during execution of the program when a debug flag is set to enable debugging functions.

3. The computer-implemented method of claim 2 wherein inserting the at least one debug command in the at least one location into the flow includes inserting commands to pass control from the runtime code to a debugger to handle execution of the debug command.

4. The computer-implemented method of claim 3 wherein when execution of the application software reaches the at least one location in the flow where the at least one software command is inserted, control of the execution of the software application is passed from the runtime code to a debugger to handle execution of the debug command.

5. The computer-implemented method of claim 4 wherein the at least one debug command is a step over command, the step over command directing execution of the software application to jump from one process to another process.

6. A computer program product embedded in a computer readable medium having instructions which when executed by a processor debug a software application comprising a plurality of processes that asynchronously co-operate and whose execution is controlled through interaction with a runtime code, the instructions comprising:
   instructions for constructing, using the runtime code, a flow diagram to represent the software application as a flow;
   instructions for inserting at least one debug command in at least one location into the flow;
   instructions for executing the software application, the at least one debug command being executed when execution of the application software reaches the at least one location in the flow where the at least one software command is inserted, wherein the at least one debug command is a step over source command, the step over source command inhibiting logic associated with source code to be executed; and
   instructions for returning a result upon execution of the at least one debug command.

7. The computer program product of claim 6 wherein the at least one debug command is executed during execution of the program when a debug flag is set to enable debugging functions.

8. The computer program product of claim 7 wherein inserting the at least one debug command in the at least one location into the flow includes inserting commands to pass control from the runtime code to a debugger to handle execution of the debug command.

9. The computer program product of claim 8 wherein when execution of the application software reaches the at least one location in the flow where the at least one software command is inserted, control of the execution of the software application is passed from the runtime code to a debugger to handle execution of the debug command.

10. The computer program product of claim 9 wherein the at least one debug command is a step over command, the step over command directing execution of the software application to jump from one process to another process.

11. A system for debugging a software application comprising a plurality of processes that asynchronously co-operate and whose execution is controlled through interaction with a runtime code, the system comprising:
   at least one storage device for storing computer instructions; and
   at least one processor for processing the computer instructions to construct, using the runtime code, a flow diagram to represent the software application as a flow, to insert at least one debug command in at least one location into the flow, to execute the software application, the at least one debug command being executed when execution of the application software reaches the at least one location in the flow where the at least one software command is inserted, wherein the at least one debug command is a step over source command, the step over source command inhibiting logic associated with source code to be executed, and to return a result upon execution of the at least one debug command.

12. The system of claim 11 wherein the at least one debug command is executed during execution of the program when a debug flag is set to enable debugging functions.

13. The system of claim 12 wherein inserting the at least one debug command in the at least one location into the flow includes inserting commands to pass control from the runtime code to a debugger to handle execution of the debug command.

14. The system of claim 13 wherein when execution of the application software reaches the at least one location in the flow where the at least one software command is inserted, control of the execution of the software application is passed from the runtime code to a debugger to handle execution of the debug command.

15. The system of claim 14 wherein the at least one debug command is a step over command, the step over command directing execution of the software application to jump from one process to another process.

* * * * *